Sept. 26, 1967  P. SOUTH ET AL  3,343,413

FLUID FLOW MEASURING DEVICE

Filed Sept. 28, 1964

Inventors
Peter South
John W. Tanney
By Stevens, Davis, Miller & Mosher
Attorneys United States Patent Office 3,343,413
Patented Sept. 26, 1967

3,343,413
FLUID FLOW MEASURING DEVICE
Peter South, Ottawa, Ontario, and John W. Tanney, Bell's Corners, Ontario, Canada, assignors to Canadian Patents and Development Limited, Ottawa, Ontario, Canada, a corporation of Canada
Filed Sept. 28, 1964, Ser. No. 399,612
10 Claims. (Cl. 73—194)

This invention relates to a device for measuring the velocity of a moving fluid and is especially suited to the measurement of the velocity of a slow moving fluid.

There are many applications in which it is desirable to be able to measure accurately the velocity of a slow moving fluid, for example in general wind and meteorological work, in wind tunnel work, and in work involving certain types of aircraft. Present devices for measuring fluid velocity, such as rotating devices, the hot wire, and the Pitot tube and manometer, all begin to fail in their accuracy when the velocity of the fluid under study falls below about one half to one foot per second. Such conventional devices have the further disadvantage that they do not conveniently indicate the direction of a fluid flow, but indicate only the magnitude of a component of the flow in a fixed direction.

It is an object of the present invention in one of its aspects to provide a device that will measure low fluid velocities with improved accuracy. A further object of the invention in another of its aspects is to provide a simple device that will measure low fluid velocities with improved accuracy and will at the same time provide information for ascertaining the direction of the fluid flow.

These and other objects of the invention will appear more clearly from the accompanying description, in which the devices described and illustrated are shown by way of example only, the broad scope of the invention being defined by the appended claims.

Figure 1:
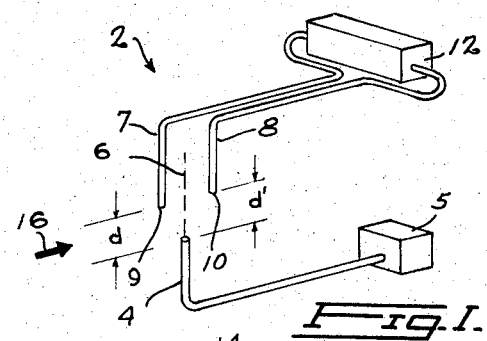
FIGURE 1 is a diagrammatic perspective view of a device according to the invention.
Figures 2, 5:
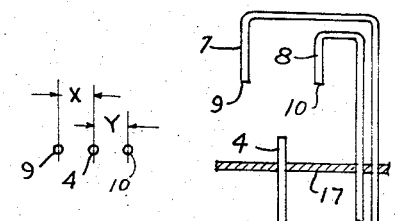
FIGURE 2 is a plan view showing an arrangement of a power nozzle and receiver mouths for the device of FIGURE 1.
FIGURE 5 is a view in section showing the device of FIGURE 1 in part as mounted on a supporting surface.

Referring first to FIGURE 1, there is shown an anemometer indicated generally at 2. The anemometer 2 includes a power nozzle 4 connected to a source 5 of fluid under pressure so that when the device is in operation, a jet of fluid, with an axis indicated at 6, will issue from the power nozzle. Two receiver tubes 7 and 8 are provided having receiver mouths 9 and 10 respectively, spaced distances $d$ and $d'$ respectively from the power nozzle in the direction of the jet of fluid issuing therefrom. (For the present, distances $d$ and $d'$ are assumed equal.) Receiver mouths 9 and 10 are spaced to opposite sides of the power nozzle 4 by distances X and Y respectively, as best shown in FIGURE 2. The receiver tubes 7 and 8 are connected to a conventional differential pressure measuring device diagrammatically indicated at 12, such as a manometer or a pressure transducer.

Figure 3:
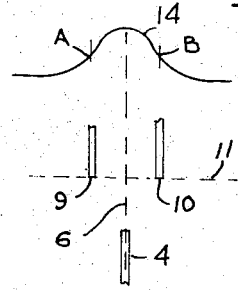
FIGURE 3 is a diagrammatic view showing a pressure distribution curve for the arrangement of FIGURE 2.
Figure 4:
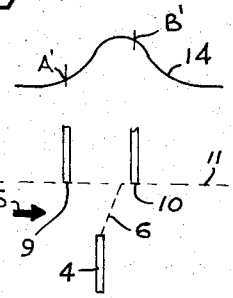
FIGURE 4 is a view similar to FIGURE 3.

The operation of the device of FIGURES 1 and 2 may be appreciated by reference to FIGURES 3 and 4, which show approximately the pressure distribution of a jet of fluid from the power nozzle 4. The pressure distribution depicted is that existing in a plane 11 transverse to the axis of the undisturbed jet and located distance $d$ or $d'$ (these distances being assumed equal) from the power nozzle in the direction of flow of the jet.

As shown in FIGURE 3, in the absence of any deflecting main stream of fluid, the pressure distribution assumes an approximately Gaussian form, depicted by curve 14. If receiver mouths 9 and 10 are positioned at equal distances X and Y to opposite sides of the power nozzle 4, then the pressure A at the mouth of receiver mouth 9 will be equal to the pressure B at the mouth of receiver mouth 10, and differential pressure measuring device 12 will record a zero reading.

The situation when a main flow of fluid to be measured is present is shown diagrammaticaly in FIGURE 4, the direction of the main stream being indicated by arrow 16. The power jet issuing from the power nozzle is deflected in the direction of the main stream (as indicated by the new position of the axis 6) and the pressures at receiver mouths 9 and 10 change, the new pressure at receiver mouth 9 being A' and that at receiver mouth 10 being B'. Because pressures A' and B' are different, differential pressure measuring device 12 will now record a reading which will be indicative of the speed of the main flow 16 of fluid.

It is apparent in any practical application of the device 2, some physical support will be necessary to hold the power nozzle 4, and receiver tubes 7 and 8 with receiver mouths 9 and 10, in proper spaced relation. The type of support will depend upon the application; for example the power nozzle 4 and receiver mouths 9 and 10 may be located in a wind tunnel, or they may as illustrated in FIGURE 5 be located above a flat supporting surface 17. Whatever supporting means is used for the power nozzle and receiver tubes of the device, it is desirable that this means interfere as little as possible with the main stream of fluid under study, and also that the power nozzle and receiver mouths be located as far as possible from any bounding surfaces such as supporting surface 17. Location of the power nozzle 4 and receiver mouths 9 and 10 well away from bounding surfaces helps to prevent entrainment, reflection, and other effects from disturbing the pressure distributions to impair the accuracy of the device.

Figure 6:
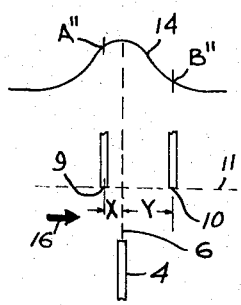
FIGURE 6 is a diagrammatic view showing a pressure distribution curve for another arrangement of the device of FIGURE 1.

If desired and as shown in FIGURE 6, one of the distances X and Y may be made greater than the other, so that when there is no deflecting main stream of fluid, the pressure at receiver mouth 9 is A", near the peak of the pressure distribution curve, and the pressure at receiver mouth 10 is B", near the base of the pressure distribution curve. Then when a deflecting main stream (with direction as indicated by arrow 16) is present, the pressure at receiver mouth 9 decreases and that at receiver mouth 10 increases. In this case, differential pressure measuring device 12 records a pressure differential when there is no main stream of fluid, and this pressure differential changes as the speed of the main stream increases, the change being recorded by measuring device 12 to indicate the velocity of the main stream. The arrangement of FIGURE 6 may be used instead of the arrangement of FIGURE 3 when it is known that the main flow will always be in one particular direction, the advantage of the FIGURE 6 arrangement being that it will measure accurately over a somewhat larger range of fluid velocities than will the FIGURE 3 arrangement.

Figure 7:
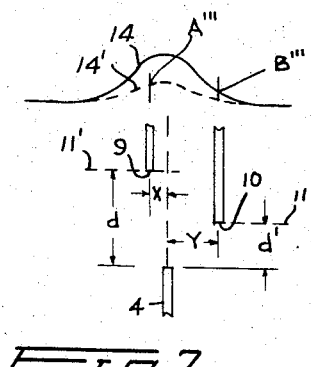
FIGURE 7 is a diagrammatic view showing pressure distribution curves for yet another arrangement of the device of FIGURE 1.

If it is desired to use an arrangement such as in FIGURE 6, for greater range, and yet have the differential pressure measuring device 12 record a zero reading when there is no main stream of fluid present, then the arrangement of FIGURE 7 may be adopted. In the FIGURE 7 arrangement, distance Y (the side spacing of receiver mouth 10 from power nozzle 4) has been made greater than distance X (the side spacing of receiver mouth 9 from power nozzle 4), just as in FIGURE 6. However in addition the spacing $d$ of receiver mouth 9 from the power nozzle 4 in the direction of the undisturbed flow of the power jet has been made greater than the spacing $d'$ of receiver mouth 10 from the power nozzle. When no main stream of fluid is present, the pressure at receiver mouth 10 is still $B''$, just as in the FIGURE 6 arrangement. However, receiver mouth 9 is now farther away from nower nozzle 4 than it was in the FIGURE 6 arrangement, and at this greater distance the pressure distribution curve 14' (depicting the pressure distributions in a plane 11' transverse to the axis 6 of the undisturbed jet and passing through receiver mouth 9) will have lower values than the pressure distribution curve 14 at the closer distance of receiver mouth 10. Therefore the pressure $A'''$ at receiver mouth 9 will be lower than the pressure $A''$ in the FIGURE 6 arrangement and in fact distances $d$ and X may be chosen with respect to distances $d'$ and Y so that pressure $A'''$ will be equal to pressure $B''$ when there is no main stream of fluid present. In this way the measuring device 12 will record zero pressure differential at zero main flow.

It has been found in practice that in measuring main stream velocities of air ranging between about 0.08 foot per second and 5 feet per second, the device may conveniently be of the following form. The power nozzle may be made with a diameter of about 0.010 inch. Its shape need not necessarily be round since if the power jet is not round when it leaves the power nozzle, it will become round within a very short distance from the power nozzle. The size of the receiver mouths is not particularly critical; normally their size is made about the same as that of the power nozzle of a little larger. The distances $d$ and $d'$ may be between about 20 and 40 power nozzle diameters (0.20 to 0.40 inch) and with this range of distances for $d$ and $d'$, the radius of the pressure distribution curve, from its peak to values equal to about 5 percent of its peak, lies between six and ten diameters approximately. When distances $d$ and $d'$ are each made equal to 30 diameters, distances X and Y where they are made equal may conveniently be about 2 diameters. The power jet is connected to an air supply of about 30 p.s.i. and under these circumstances the velocity of the power jet is almost sonic. Indeed it has been found that it is generally advantageous to employ relatively high ratios of power jet velocity to main stream velocity, e.g. ratios of two or three hundred to one. In such ratios the main stream velocity will be the velocity normally expected to be measured for the main stream, i.e. approximately the expected average velocity.

It should be noted that the pressure distribution curve for the power jet at any selected distance downstream along its axis 6 from the power nozzle is not in fact exactly Gaussian, and further, the presence of a main flow does to some extent distort the shape of the pressure distribution curve. However at low main flow velocities the distortion is slight and affects the accuracy of the measurements but little. If it is desired to measure higher main flow velocities than, for example, about 5 feet per second, it may be desirable to reduce the distances $d$ and $d'$. If these distances are reduced for example to about 10 diameters, then the device will measure higher main flow velocities, but at some sacrifice in sensitivity in measuring low main flow velocities.

Figure 8:
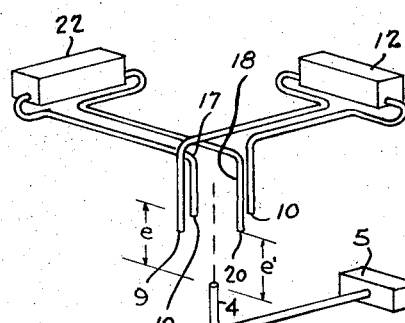
FIGURE 8 is a diagrammatic perspective view of another device according to the invention.
Figure 9:
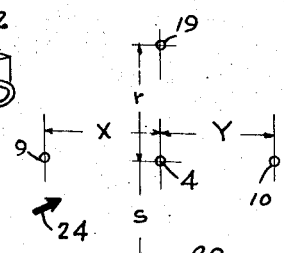
FIGURE 9 is a plan view showing an arrangement of a power nozzle and receiver mouths for the device of FIGURE 8.

Referring next to FIGURES 8 and 9, there is shown a device similar to that of FIGURE 1 but having an extra pair of receiver tubes 17 and 18 having receiver mouths 19 and 20 respectively. Receiver mouths 19 and 20 are spaced distances $r$ and $s$ respectively to opposite sides of the power nozzle 4 in a direction transverse to the axis of the undisturbed jet and transverse to the first pair of receiver mouths 9 and 10, as shown in FIGURE 9. Receiver mouths 19 and 20 are also spaced distances $e$ and $e'$ respectively from the power nozzle 4 in the direction of undisturbed flow of the power jet. Receiver tubes 17 and 18 are connected to another differential pressure measuring device 22 similar to measuring device 12.

The device of FIGURES 8 and 9 functions substantially in the same way as that of FIGURE 1, but it may be used to measure the speed and direction of a main stream of fluid moving in any direction transverse to the axis 6 of the power jet. For example, assuming that a main stream of fluid flows from a direction indicated by arrow 24 in FIGURE 9, measuring device 12 will indicate the component of velocity in the direction between receiver mouths 9 and 10 as viewed in FIGURE 9, and measuring device 22 will indicate the component of velocity in the direction between receiver mouths 19 and 20 as viewed in FIGURE 9. Combining the two components will give the resultant velocity and direction of the main stream.

It may be noted that a component of velocity in one direction will push and distort the power jet to some extent and thus will affect to some extent the reading of the instrument for a component of velocity in another direction. However at low main stream velocities, where the invention is expected to have its primary application, the error in the readings introduced in this manner is relatively slight and can be reduced by means of calibration curves.

Figure 10:
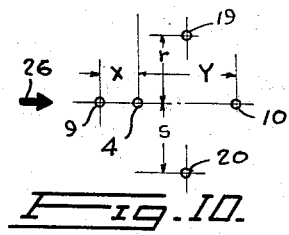
FIGURE 10 is a plan view showing another arrangement of the device of FIGURE 8.

It will be apparent that distances $e$ and $e'$ and distances $r$ and $s$ can be arranged so that in any particular application of the device, optimum results will be obtained. For example, as shown in FIGURE 10, if the major component of the main flow is expected always to be in the direction indicated by arrow 26, with only a minor component at right angles thereto, then distance Y may be made greater than distance X. In addition receiver mouths 19 and 20 may be spaced downstream of the power nozzle 4 in the direction of the major component of the main stream. In this way, measurement of the minor component of the main stream will not be greatly affected by deflection of the power jet caused by the major component of the main stream.

Figures 11, 12:
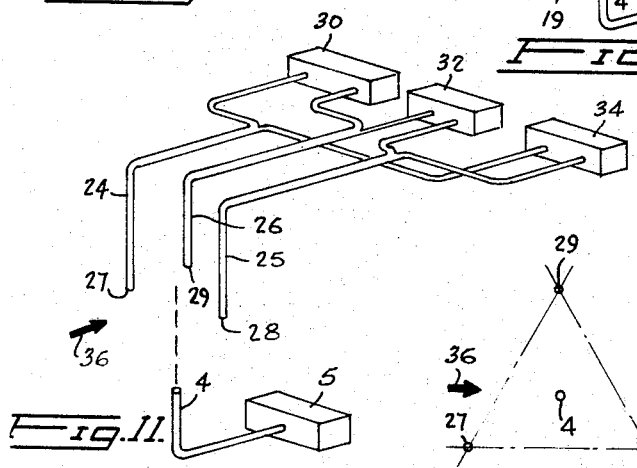
FIGURE 11 is a diagrammatic perspective view of another device according to the invention.
FIGURE 12 is a plan view showing an arrangement of power nozzle and receiver mouths for the device of FIGURE 11.

Referring now to FIGURES 11 and 12, there is shown another embodiment of the invention in which three receiver tubes 24, 25 and 26 are provided, having receiver mouths 27, 28 and 29 respectively equally spaced from power nozzle 4 in the direction of the undisturbed power jet and arranged in the form of a triangle. The triangle will normally be equilateral with power nozzle 4 and hence the axis 6 of the undisturbed power jet located at its centre in plan view as shown in FIGURE 12. As diagrammatically indicated, each combination of two receiver tubes is connected to a pressure measuring device, i.e. tubes 24 and 26 are connected to measuring device 30, tubes 25 and 26 are connected to measuring device 32, and tubes 24 and 25 are connected to measuring device 34. Then in the absence of any main stream of fluid, and with the equilateral spacing referred to, the measuring devices 30, 32 and 34 will all record zero readings. In the presence of a main flow in a direction transverse to the undeflected direction of the power jet, as indicated for example by arrow 36, pressure differentials will be created between the various pairs of receiver mouths. These differentials will be recorded by the measuring devices 30, 32 and 34 to indicate the direction and speed of the main fluid flow.

It will be apparent that the arrangement of the receiver mouths 27, 28 and 29 need not be in the form of an equilateral triangle; other triangular forms may be used. In addition the receiver mouths need not necessarily be spaced all at equal distances from the power nozzle in the direction of the undeflected power jet. Unequal spacings (as used in the arrangement of FIGURE 7) may be adopted. Further, other types and arrangements of pressure measuring devices than those indicated in FIGURE 11 may be used to obtain three components of main flow velocity, from which a resultant velocity and direction may be derived.

Although the foregoing description has assumed the use of air as the fluid the velocity of which is being measured, the invention is equally applicable to measurement of velocity of other types of fluids, including liquids.

We claim:

1. A device for measuring the velocity of a fluid stream comprising:
   (a) a power nozzle,
   (b) means for connecting said nozzle to a pressure source of said fluid to cause to issue from said nozzle a jet of fluid having an approximately Gaussian pressure distribution in a plane transverse to the axis of said jet,
   (c) receiver means including first and second receiver mouths,
   (d) means mounting said receiver means to space said receiver mouths from said nozzle substantially in the direction of flow of said jet, with each mouth oriented to receive fluid from said jet,
   (e) means for locating said nozzle and said receiver mouths in said fluid stream with said jet extending directly across the stream direction,
   (f) said means (e) including means for locating said first receiver mouth at a first distance upstream of said nozzle in said stream direction and means for locating said second receiver mouth downstream of said nozzle in said stream direction at a second distance greater than said first distance,
   (g) and means connected to said receiver means for measuring the differential fluid pressure between said receiver mouths.

2. A device according to claim 1 wherein said means (d) includes means spacing said first receiver mouth farther from said nozzle in the direction of flow of said jet than said second receiver mouth, for the fluid pressure at said second receiver mouth to be substantially equal to the fluid pressure at said first receiver mouth during undisturbed flow of said jet.

3. A device for measuring the velocity of a fluid stream comprising:
   (a) a power nozzle,
   (b) means for connecting said nozzle to a pressure fluid source to cause a jet of fluid to issue from said nozzle,
   (c) first receiver means including a first pair of receiver mouths and second receiver means including a second pair of receiver mouths,
   (d) means mounting both said receiver means to space said receiver mouths from said nozzle substantially in the direction of flow of said jet, with each mouth oriented to receive fluid from said jet,
   (e) means for locating said nozzle and said receiver mouths in said fluid stream with said jet extending directly across the direction of said stream,
   (f) said means (e) including mounting means to space said first pair of receiver mouths apart in a first direction transverse to the axis of said jet when undisturbed and mounting means to space said second pair of receiver mouths apart in a second direction transverse to said axis and to said first direction,
   (g) means connected to said first receiver means for measuring the differential fluid pressure between said first pair of receiver mouths,
   (h) and means connected to said second receiver means for measuring the differential fluid pressure between said second pair of receiver mouths.

4. A device according to claim 3 wherein said mounting means (f) locates said first and second pairs of receiver mouths respectively in first and second planes parallel to the axis of said jet when undisturbed, said first plane intersecting said second plane in a line lying between said axis and one of said receiver mouths.

5. A device according to claim 3 wherein said means (d) includes means spacing the receiver mouths of said first pair each at a first distance from said nozzle in the direction of flow of said jet and means spacing the receiver mouths of said second pair each at a second distance from said nozzle in the direction of flow of said jet, and said mounting means (f) locates the receiver mouths of said first pair each at a third distance in opposed directions from said nozzle, said means (f) also locating the receiver mouths of said second pair each at a fourth distance in opposed directions from said nozzle.

6. A device for measuring the velocity of a stream of fluid comprising:
   (a) a power nozzle,
   (b) a pressure source of said fluid,
   (c) means connecting said nozzle to said pressure source to cause a jet of said fluid to issue from said nozzle, the pressure of said source and the diameter of said nozzle being selected for said jet to have a velocity at least two hundred times the average velocity of said fluid stream,
   (d) first receiver means including a first pair of receiver mouths and second receiver means including a second pair of receiver mouths,
   (e) means mounting both said receiver means to space said receiver mouths from said nozzle in the direction of undisturbed flow of said jet by a distance in the range of twenty to forty of said diameters with each mouth oriented to receive fluid from said jet,
   (f) means for locating said nozzle and said receiver mouths in said fluid stream with said jet extending directly across the direction of said stream,
   (g) said means (f) including mounting means to space the receiver mouths of said first pair from said nozzle in substantially opposed directions transverse to the axis of said jet when undisturbed, and mounting means to space the receiver mouths of said second pair from said nozzle in substantially opposed directions transverse to the axis of said jet when undisturbed and transverse to said first pair of receiver mouths,
   (h) means connected to said first receiver means for measuring the differential fluid pressure between said first pair of receiver mouths,
   (i) and means connected to said second receiver means for measuring the differential fluid pressure between said second pair of receiver mouths.

7. A device for measuring the velocity of a fluid stream comprising:
   (a) a power nozzle,
   (b) means for connecting said nozzle to a pressure fluid source to cause a jet of fluid to issue from said nozzle,
   (c) receiver means including three receiver mouths,
   (d) means mounting said receiver means to space said receiver mouths from said nozzle substantially in the direction of flow of said jet, with each mouth oriented to receive fluid from said jet,
   (e) means for locating said nozzle and said receiver mouths in said fluid stream with said jet extending directly across the direction of said stream,
   (f) said means (e) including mounting means to space said receiver mouths apart in directions transverse to the axis of said jet for said receiver mouths to define the vertices of a triangle, (g) and means connected to said receiver means for measuring fluid pressure differentials between respective pairs of receiver mouths.

8. A device according to claim 7 wherein said mounting means (f) spaces said receiver mouths so that the axis of said jet when undisturbed passes through the area bounded by the side of said triangle.

9. A device according to claim 8 wherein said means (d) includes means spacing all of said receiver mouths at equal distances from said nozzle in the direction of flow of said jet when undisturbed, and said mounting means (f) is such that said triangle is equilateral and said axis passes through the centre of said area.

10. A device for measuring the velocity of a fluid stream comprising:
(a) a power nozzle,
(b) a pressure source of said fluid,
(c) means connecting said nozzle to said pressure source to cause a jet of fluid to issue from said nozzle, the pressure of said source and the diameter of said nozzle being selected for said jet to have a velocity at least two hundred times the average velocity of said fluid stream,
(d) receiver means including three receiver mouths,
(e) means mounting said receiver means to space said receiver mouths from said nozzle in the direction of undisturbed flow of said jet by a distance in the range of twenty to forty of said diameters, with each mouth oriented to receive fluid from said jet,
(f) means for locating said nozzle and said receiver mouths in said fluid stream with said jet extending directly across the direction of said stream,
(g) said means (f) including mounting means to space said receiver mouths apart in directions transverse to the axis of said jet for said receiver mouths to define the vertices of a triangle with the axis of said jet when undisturbed passing through the area bounded by the sides of said triangle,
(h) and means connected to said receiver means for measuring fluid pressure differentials between respective pairs of receiver mouths.

References Cited

UNITED STATES PATENTS

| | | | |
|---|---|---|---|
| 1,841,607 | 1/1932 | Kollsman. | |
| 3,098,383 | 7/1963 | West | 73—194 |
| 3,208,463 | 9/1965 | Hurvitz | 137—81.5 |
| 3,233,522 | 2/1966 | Stern | 73—521 X |
| 3,292,648 | 12/1966 | Colston | 73—523 X |

OTHER REFERENCES

H. Ziebolz: Analysis and Design of Translator Chains, published by Askania Regulator Co., Chicago, Ill., 1946, vol. 2, Diagrams, TA 165 Z5 V2.

RICHARD C. QUEISSER, *Primary Examiner.*

E. D. GILHOOLY, *Assistant Examiner.*